US005798795A

United States Patent [19]
Glenn et al.

[11] Patent Number: 5,798,795
[45] Date of Patent: Aug. 25, 1998

[54] METHOD AND APPARATUS FOR ENCODING AND DECODING VIDEO SIGNALS

[75] Inventors: William E. Glenn; Robert L. Dhein, both of Ft. Lauderdale; Fouad Guediri, Boca Raton; Pedro Monteiro, Boca Raton; Adalberto Moreno, Boca Raton, all of Fla.

[73] Assignee: Florida Atlantic University, Boca Raton, Fla.

[21] Appl. No.: 609,605

[22] Filed: Mar. 1, 1996

[51] Int. Cl.$^6$ .................... H04N 7/30; H04N 7/32
[52] U.S. Cl. .............. 348/398; 348/397; 348/399; 348/438
[58] Field of Search ............... 348/398, 397, 348/408, 399, 426, 432, 437, 438; 382/240; H04N 7/30, 7/32

[56] References Cited

U.S. PATENT DOCUMENTS

| | | | |
|---|---|---|---|
| 4,517,597 | 5/1985 | Glenn | 348/398 |
| 4,628,344 | 12/1986 | Glenn | 348/398 |
| 4,636,857 | 1/1987 | Achiha et al. | 348/398 |
| 4,652,909 | 3/1987 | Glenn | 348/398 |
| 4,701,783 | 10/1987 | Glenn | 348/398 |
| 4,800,426 | 1/1989 | Glenn | 348/398 |
| 5,128,754 | 7/1992 | Dhein | 348/398 |
| 5,159,453 | 10/1992 | Dhein et al. | 348/398 |
| 5,202,760 | 4/1993 | Tourtier et al. | 348/398 |
| 5,235,420 | 8/1993 | Gharavi | 348/398 |
| 5,235,421 | 8/1993 | Yang | 348/398 |
| 5,325,125 | 6/1994 | Naimpally et al. | 348/402 |
| 5,382,979 | 1/1995 | Mun | 348/398 |
| 5,412,741 | 5/1995 | Shapiro | 348/398 |
| 5,446,495 | 8/1995 | Tourtier et al. | 348/398 |
| 5,469,517 | 11/1995 | Ohta | 348/398 |
| 5,561,463 | 10/1996 | Thomas et al. | 348/398 |

OTHER PUBLICATIONS

Glenn et al. "Simple Scalable Video Compression Using 3-D Subband Coding", presented at the SMPTE Advanced Television and Electronic Imaging Conference in San Francisco, CA, on Feb. 11, 1995, and published in the Mar., 1996 SMPTE Journal.

Glenn et al. "Subband Coding Compression System For Program Production", presented at the 136th SMPTE Technical Conference in Los Angeles, CA, in Oct., 1994.

W.E. Glenn, "Digital Image Compression Based On Visual Perception And Scene Properties", Presented at the 133rd SMPTE Technical Conference in Los Angeles on Oct. 27, 1991, and published in the May, 1993, SMPTE Journal.

W. Glenn, K. Glenn, C. Bastian, "Imaging System Design Based On Psychophysical Data", Proc. of SID, vol. 26/I, pp. 71–78 (1985).

"Visual Psychological Factors as Applicable to the Design and Development of Video Systems for Use in Space", NYIT Final Rept. to NASA, (May 1989).

R.C. Gonzales et al., "Digital Image Processing" Addison–Wesley, pp. 80–83 (1987).

E. Dubois et al. "Three Dimensional Spectrum and Processing of Digital NTSC Color Signals", SMPTE J, (Apr. 1982).

B. Wendlund et al. "On Picture Quality of Some TV Signal Processing Techniques", SMPTE J. (Oct. 1984).

(List continued on next page.)

Primary Examiner—Tommy P. Chin
Assistant Examiner—Vu Le
Attorney, Agent, or Firm—Martin M. Novack

[57] ABSTRACT

A method is set forth for encoding and decoding a video signal, including the following steps: encoding the signal, the encoding including separating the signal into a plurality of spatial frequency bands at different frame rates, and temporally pre-filtering at least one of the bands with a pre-filtering circuit; and decoding the encoded signal, the decoding preferably including temporally post-filtering the at least one band, and combining the bands. In a preferred embodiment temporal pre-filtering is low-pass temporal filtering with a filter cut-off in the range 1.25 to 1.75 times the temporal Nyquist limit for the frame rate of the at least one band. The temporal post-filtering is preferably low pass temporal filtering with a cut-off near the Nyquist limit.

10 Claims, 7 Drawing Sheets

OTHER PUBLICATIONS

W.E. Glenn, "HDTV Compatible Transmission System", National Association of Broadcasters, Apr., 1986.

W.E. Glenn, "Compatible Terrestrial HDTV Transmission", NAB Engineering Conference Proceedings, Apr., 1986.

M.A. Insnardi et al., "Advanced Compatible Television, A Progress Report" SMPTE Journal, Jul., 1989.

W.F. Schreiber et al., "Reliable EDTV/HDTV Transmissiion in Low–Quality Analog Channels" SMPTE Journal, Jul., 1989.

Chang et al, "Scalable Video Coding Using 3–D Subband Velocity Coding and Multriate Quantization", IEEE, 1993.

Mokry et al, "Bandwidth Reduction for HDTV Transmission–Alternatives and Subjective Results", IEEE 1990.

Taubman et al, "Rate and Resolution Scalable Video and Image Compression with Subband Coding", IEEE 1993.

Tsunashima et al, "A Scalable Motion–compensated Subband Image Coder", IEEE 1994.

Wu et al, "Scalable Implementations Scheme for Multirate FIR Filters and Its Applications in Efficient Design of Subband Filter Banks", IEEE 1996.

Mlynek et al, "VLSI for Digital Television", IEEE 1995.

Tan et al, "A Frequency Scalable Coding Scheme Employing Pyramid and Subband Techniques", IEEE 1994.

Hsu et al, "Scalable HDTV Coding With Motion Compensated Subband and Transform Coding", IEEE 1995.

Singh et al, "Multidimensional Quantizers for Scalable Video Compression", IEEE 1993.

METHOD AND APPARATUS FOR ENCODING AND DECODING VIDEO SIGNALS

This invention was made with Government support, and the Government has certain rights in this invention.

FIELD OF THE INVENTION

This invention relates to video signals and, more particularly, to a method and apparatus for encoding and decoding video signals for use in television and in high definition television systems, teleconferencing, picture phones, and computer video transmission, as well as in other applications that include storage and/or transmission, over any suitable medium, of moving images, in a form that requires reduced storage capacity and/or reduced bandwidth channels. The techniques hereof can be employed, for example, for transmitting through the air or through conducting or optical cable, video signals of reduced bandwidth with little or no perceived degradation of image quality.

BACKGROUND OF THE INVENTION

Available spectrum is becoming increasingly burdened by ever greater demand for video information channels. Traditional airwave spectral space has been crowded for many years, and burgeoning video programming for such applications as home cable, teleconferencing, picture phones, and computer video transmission has now crowded conductive and optical cables, phone lines, and satellite communication channels. The desirability of techniques for increasing the amount of video information that can be sent over these transmission media is evident. Also, as more video information is stored, it is desirable to develop techniques that increase the amount of video that can be stored in a given storage size.

A number of systems have been developed for point-to-multipoint transmission. For these applications it is not problematic that the associated bandwidth compression systems have very complex and expensive encoders, since the number of encoders is small compared to the number of decoders. However, for applications such as two-way video communications, video surveillance, and video cameras, a lower cost and less complex encoder is needed. It is among the objects hereof to address and solve this problem.

It is known that electronic video signal can be encoded at reduced bandwidth by lowering the frame refresh rate of the high spatial frequency components, while maintaining the frame refresh rate of at least a portion of the low spatial frequency components at the standard rate. Reference can be made, for example, to U.S. Pat. Nos. 4,517,597, 4,628,344, 4,652,909 and 4,701,783, and 4,800,426. If done in a specified manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth.

As indicated, in compression systems that divide the image into spatial frequency bands, compression can be achieved by sending the different bands at different frame rates, and the choice of the temporal frame rate used for each spatial band depends on matching the spatio-temporal response of the visual system. However, the temporal dynamics of sub-band coding can result in temporal artifacts in certain situations, and it is among the objects of the present invention is to address and solve this problem in prior art approaches.

Raster scanned images have greater resolution in the diagonal direction than in either the horizontal or vertical. The human vision system, on the other hand, is more sensitive to horizontal and vertical detail. It is known that a diagonal sampling grid can be used to provide improved horizontal and vertical resolution, closely matching the characteristics of human vision. A diagonal interpolating filter can be used at the system output to convert the processed image back to a rectilinear sampling grid for a pleasing display. Conventional two-dimensional filters use spatial samples in the immediate neighborhood, horizontally, vertically, and diagonally to produce the filtered sample. This process restores the spatial response, with some compromise in diagonal resolution. Interlaced video, however, temporally offsets adjacent raster lines of the image by one field time. This temporal delay causes severe artifacts when two-dimensional filters are used on moving images. It is also among the objects of the present invention is to address and solve this problem in prior art approaches.

SUMMARY OF THE INVENTION

In a three-dimensional sub-band coding system for video compression, high spatial frequencies are assigned slower frame rates than low spatial frequencies. In an embodiment hereof, an electrical temporal pre-filter is used in the encoder of an encoder/decoder system, and an electrical temporal post-filter is used in the decoder. The filters are temporal low-pass filters. Sampling theory would dictate that these temporal filters should have a cut-off frequency at the Nyquist limit of the temporal frame rate used for the particular spatial frequency band. However, this tends to result in "smear" of moving objects. If pre- and post-filters are not used, either a "jerky" motion occurs or multiple images appear for moving objects. In accordance with a feature of the invention improved motion rendition is achieved using temporal pre-filters having a cut-off in the range of 1.25 to 1.75 times the Nyquist limit.

In an embodiment of this form of the invention, a method is set forth for encoding and decoding a video signal, comprising the following steps: encoding the signal, the encoding including separating the signal into a plurality of spatial frequency bands at different frame rates, and temporally pre-filtering at least one of the bands with a pre-filtering circuit; and decoding the encoded signal, the decoding preferably including temporally post-filtering the at least one band, and combining the bands. In a preferred embodiment of this form of the invention, the temporal pre-filtering comprises low-pass temporal filtering with a filter cut-off in the range 1.25 to 1.75 times the temporal Nyquist limit for the frame rate of said at least one band. The temporal post-filtering is preferably low pass temporal filtering with a cut-off near the Nyquist limit; that is, for purposes hereof, within 25 percent of the Nyquist limit.

A further feature of the present invention addresses the problem of artifacts which occur when two-dimensional filters are used on moving images; the problem being particularly significant for interlaced video. In an embodiment hereof, low spatial frequency processing treats individual fields as 1/60 second frames in a way that permits spatial filtering on a field basis, thereby minimizing temporal artifacts. A disclosed embodiment set forth a technique for encoding and decoding an interlaced video signal, comprising the following steps: encoding the interlaced signal, the encoding including: separating the signal into frequency bands to obtain a high frequency band and at least one low frequency band; spatially and temporally decimating the at least one low frequency band; scan converting the high frequency band to obtain a progressively scanned signal, and spatially and temporally decimating the high frequency band progressively scanned signal; and decoding the encoded signals, the decoding including: temporally interpolating the at least one low frequency band; spatially post-filtering the high frequency band; and combining the bands.

Further features and advantages of the invention will become more readily apparent from the following detailed description when taken in conjunction with the accompanying drawings.

BRIEF DESCRIPTION OF THE DRAWINGS

FIG. 4, which includes

DETAILED DESCRIPTION

Figure 1:
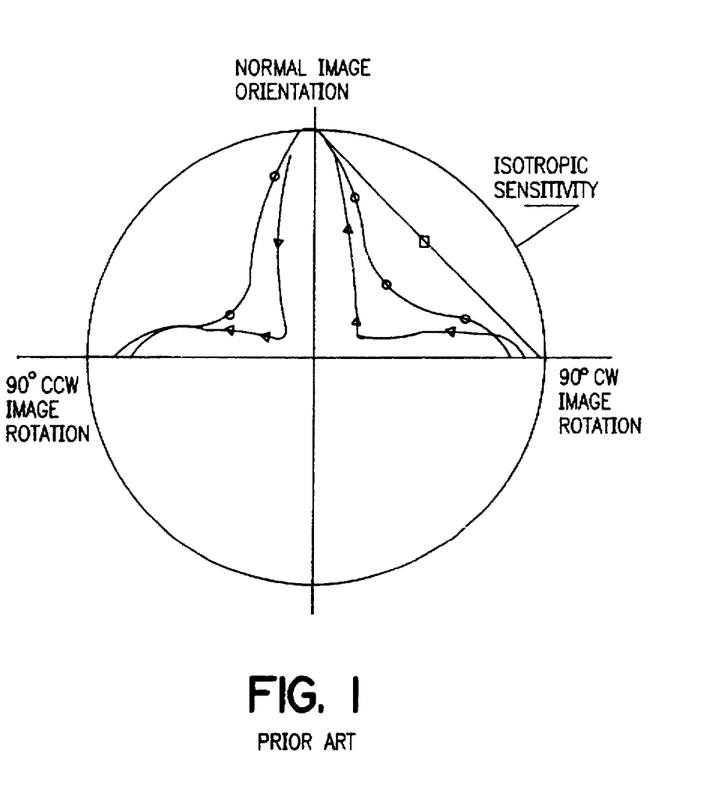
FIG. 1 is a polar plot illustrating data that measures the oblique effect.

Subjective vision studies have indicated that perceived resolution is anisotropic. The eye is more sensitive to detail along the horizontal and vertical axes than to that along diagonals. [See, for example, W. E. Glenn et al., "Imaging System Design Based On Psychophysical Data," Proc. of the SID, Vol 26/1, pp. 71–78, January (1985); NYIT STRC "Visual Psychophysical Factors as Applicable to the Design and Development of Video Systems for Use in Space, Final Report," NASA Report, May (1989); G. C. Higgins et al., "Variation of Visual Acuity with Various Test-Object Orientations and Viewing Conditions," J. Opt. Soc. Am. 40, pp. 135–137 (1950); F. W. Campbell et al., "Orientational Selectivity of the Human Visual System," J. Physiol., 187, pp. 437–445, (1966); and S. Appelle, "Perception and Discrimination as a Function of Stimulus Orientation: The "Oblique Effect" in Man and Animals," Psychological Bulletin, Vol. 78, No. 4, pp. 266–278, (1972).] FIG. 1 illustrates this oblique effect, plotted in polar form, as characterized by various researchers. While results differ somewhat due to the different types of testing employed, the curves of subjective resolution have a similar shape and diverge from the isotropic resolution shown by the outer circle.

Figure 2A:
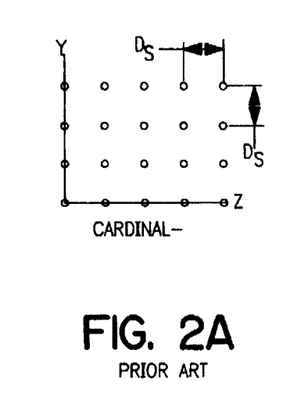
FIGS. 2A, 2B and 2C respectively illustrate cardinal sampling, quincunx sampling, and quincunx sampling with reduced sampling rate.
Figure 2B:
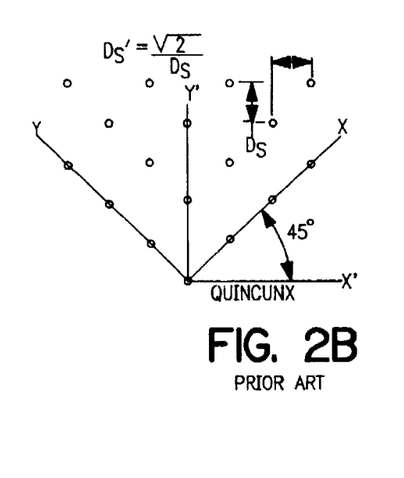
Figure 2C:
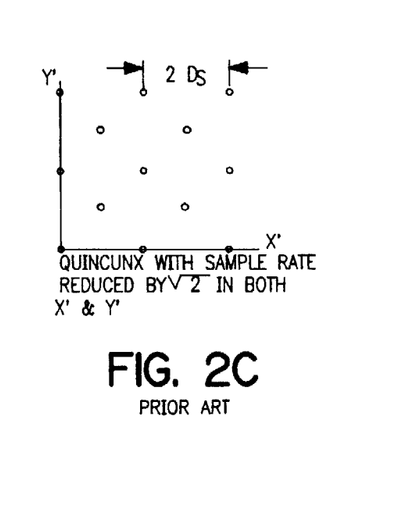
Figure 3A:
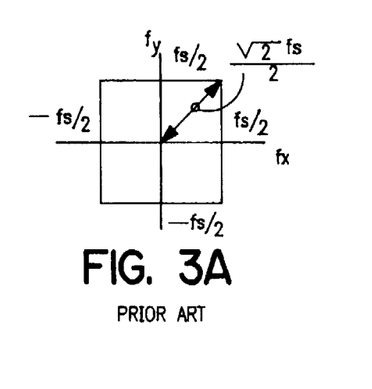
FIGS. 3A, 3B and 3C respectively illustrate spectra for the FIG. 2A, 2B and 2C situations.
Figure 3B:
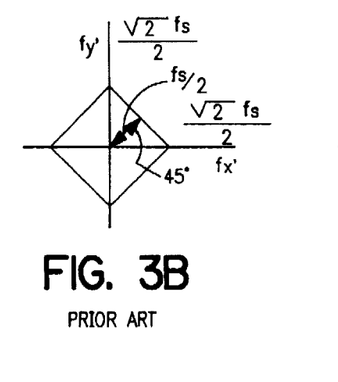
Figure 3C:
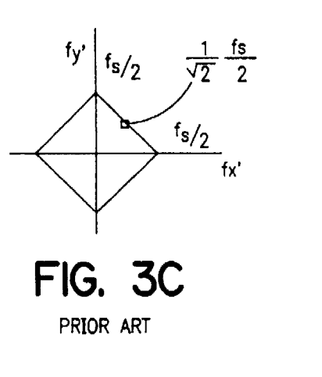

It is known that bandwidth and display element density can be reduced by taking advantage of the anisotropic spatial response characteristics of the visual system. FIGS. 2A, 2B and 2C respectively illustrate cardinal sampling, quincunx (or diagonal) sampling, and quincunx sampling with reduced sampling rate. FIGS. 3A, 3B and 3C show the respective discrete spectra for the sampling of FIGS. 2A, 2B and 2C, where $f_s = 1/D$. The quincunx sampling shown in FIGS. 2B and 2C results in the rotation of the spectral coordinate axes by 45 degrees [see, for example, R. C. Gonzales et al., Digital Image Processing, Reading Mass., Addison-Wesley (1987); E. Dubois et al.,"Three-Dimensional spectrum and Procession of Digital NTSC Color Signals," SMPTE Journal, pp. 372–378, April (1982); and B. Wendland et al. "On Picture Quality of Some Television Signal Processing Techniques," SMPTE Journal, pp. 915–922, October, (1984)], thereby more closely matching the characteristics of vision. This method can be used to reduce the information content by a factor of two without degradation in perceived image quality. Half tone prints and, more recently, CCD cameras and LCD displays successfully utilize this technique. Various video processing systems utilize quincunx sampling to reduce the sampling rate, and therefore the augmentation bandwidth, by a factor of two, although, as first indicated above, motion rendition can be problematic.

Figure 4A:
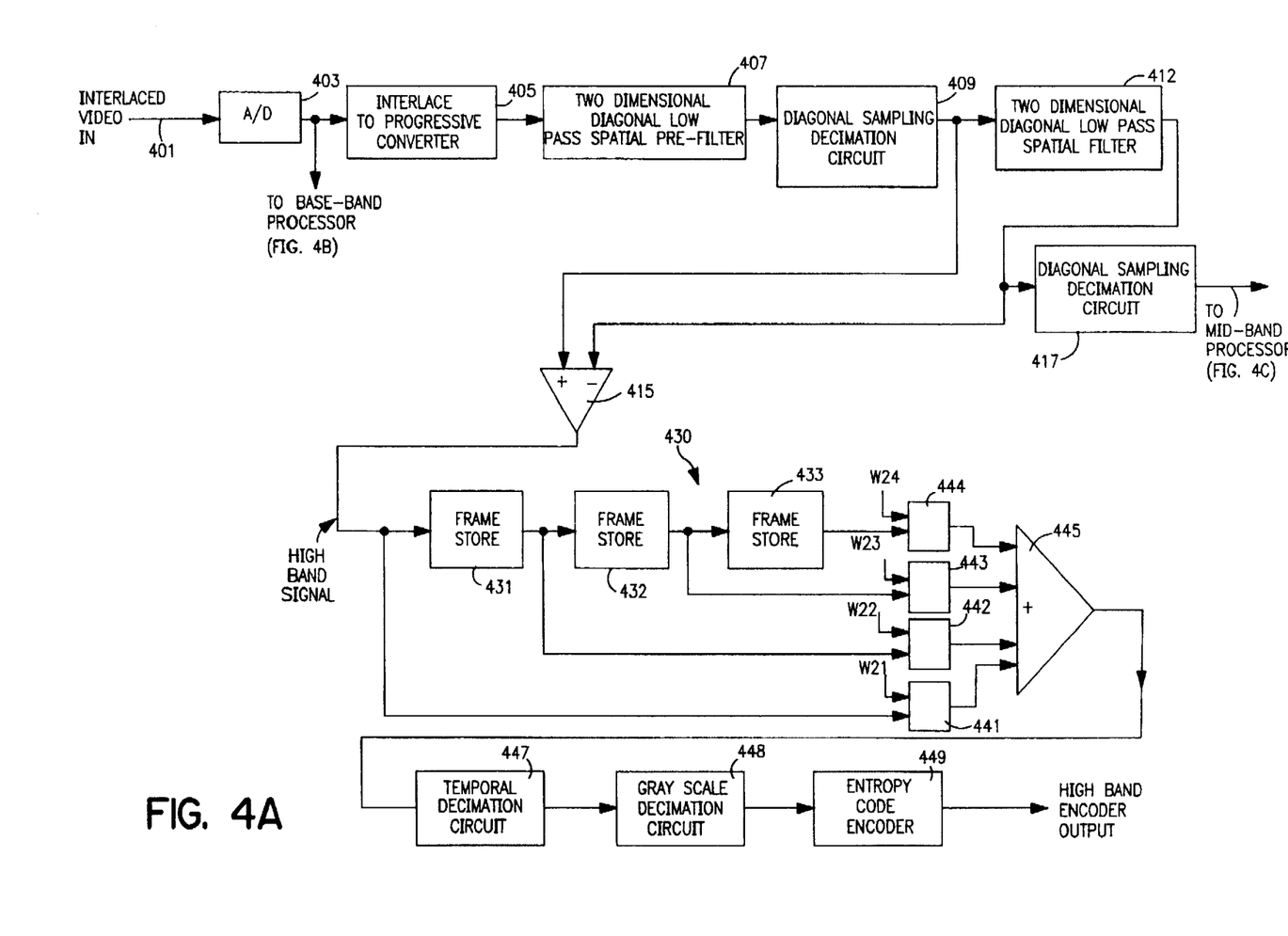
FIGS. 4A, 4B, and 4C, is a block diagram of an embodiment of an encoder and encoding method in accordance with a form of the invention.

Referring to FIG. 4, there is shown a block diagram of the encoder portion of an apparatus in accordance with an embodiment of the invention. An input video signal on a line 401 (FIG. 4A) may be from any suitable source, for example a camera or a storage device. The signal can be in analog or digital form and, if in analog form, can preferably be sampled for digital storage, such as by analog-to-digital converter 403. Conventional clock and timing inputs to A/D and other circuits are omitted for clarity of illustration. The video signal is processed in a plurality of bands, three bands being used in a particular preferred embodiment; namely, a base-band, a mid-band, and a high-band.

Figure 4B:
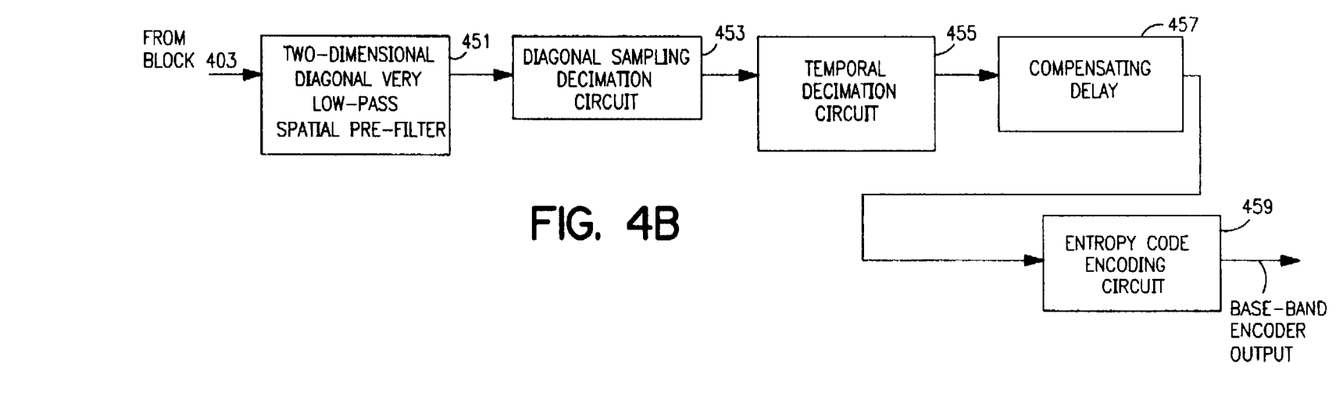
Figure 5:
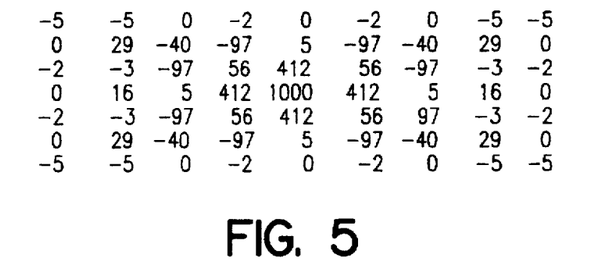
FIG. 5 illustrates an example of the coefficients of a 9×7 filter kernel array.
Figure 6:
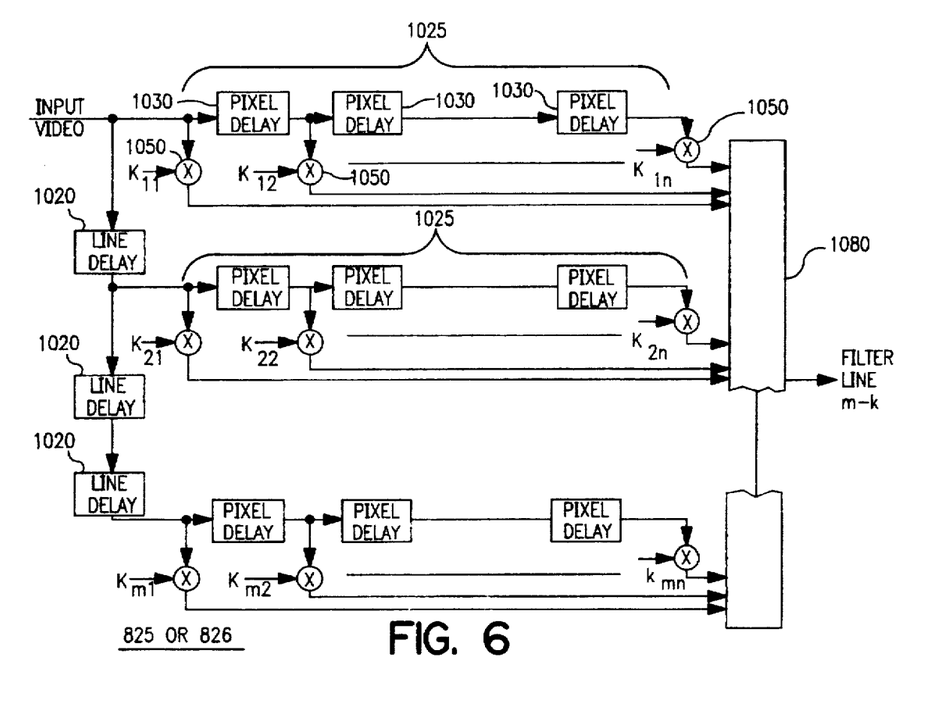
FIG. 6 is a block diagram of circuit which can be utilized to implement filtering by two-dimensional convolution with a filter kernel.

The encoder base-band processing is illustrated in FIG. 4B. The digital video signal is coupled to a two-dimensional diagonal very low pass spatial pre-filter, as represented by the block 451. [As used herein, terms such as "high", "low", and "very low" are in reference to one another.] The filter has a diamond shaped response. The two-dimensional diagonal low-pass filter 451, and other similar filters hereof, can be implemented by any suitable technique. For example, a commercial programmable filter kernel can be utilized to obtain the desired filtering function. FIG. 5 illustrates an example of the type of coefficients of a 9×7 filter kernel array that can be utilized to implement two-dimensional diagonal low-pass filtering. The filter kernel can be applied by convolving the array with the frame of pixels to be filtered. Techniques for implementation of the filtering process are known in the art. FIG. 6 shows a block diagram of a circuit which can be utilized to implement two-dimensional convolution, and which can be employed, with appropriate weighting coefficients, in the present embodiment to implement a two-dimensional diagonal low-pass filter. In the circuit of FIG. 6, an array of coefficients $k_{ij}$, are applied to an (m)×(n) moving group of pixels by using m line delays 1020 and n pixel delays which are indicated in FIG. 6 by representative register rows 1025, each of which has individual stages with respective one pixel delays. Shift registers or FIFOs may be used for this purpose. Each pixel and delayed pixel is multiplied by a coefficient, $k_{ij}$, with the coefficient values being implemented by applying corresponding signal levels to the multipliers 1050. The coefficients can be in accordance with the selected array for a particular filter kernel, for example an array of the type illustrated in FIG. 5. The outputs of multipliers 1050 are summed by a summing circuit 1080 which produces each convolved output signal as the array "moves" over the frame. It will be understood that other filter implementations, including commercially available chips, can be utilized, if desired, and that end conditions can be handled by techniques known in the art.

Referring again to FIG. 4, after the two-dimensional diagonal very low pass filtering of block 451, the block 453 is entered, this block representing diagonal sampling of the pre-filtered signal at one-fourth the original resolution. This can be done by selecting every other pixel on every other line to obtain a diagonal pattern. [It will be understood that this operation, or any of the spatial or temporal decimation operations hereof, can be implemented in known manner using the available clock and timing signals, and switching functions. The individual diagonal sampling and decimation functions hereof are, per se, of types known in the art.] The resulting signal is temporally decimated by leaving out every other field, as represented by the block 455. Since one field is empty, (i.e., the field containing the lines with no selected pixels from the prior diagonal sampling on every other line), the temporal decimation of block 455 omits the empty field.

The output of block 455 is coupled to a delay circuit 457, which compensates, if necessary, for differences in the delay inherent in processing by the different bands. [Compensating delays are also provided in other bands for this purpose, and the respective delays can be determined empirically.] Also, in the present embodiment, the processed signals for the respective bands can be coded for compression or further compression, as represented in the base-band processor by the entropy coding circuit 459, which can be of conventional type. Examples of entropy codes are run-length codes, Huffman codes, or Lempel-Ziv codes. The output of block 459 is one of three sub-band coded signals that are output from the encoder. These signals can be transmitted, stored and fetched, and/or otherwise coupled with the decoder in any suitable manner.

Referring again to FIG. 4A, a converter circuit, which may be of known type, typically including one or more frame stores for loading and reading out, is used to convert the conventional interlaced video signal to a progressively scanned video signal. As an example, this can be implemented by clocking lines into a frame store at alternate addresses for the fields of a frame, and then clocking out from addresses in sequence to obtain, for example, 525 line progressive scan frames of 1/30 second duration. The progressive scan signal is coupled to another two-dimensional diagonal low pass spatial pre-filter 407, having a diamond shaped response pattern. The pre-filter 407 can be of the type previously described, but it being understood that this filter has coefficients selected for a higher cut-off.

The output of pre-filter 409 is coupled to diagonal sampling circuit 409, which forms a diagonally sampled image signal by leaving out every other pixel on every line, with odd pixels being left out on even lines, and even pixels being left out on odd lines. For purposes hereof, this can be referred to as full resolution diagonal sampling (i.e., where horizontal and vertical resolution are at the original, but with the diagonal resolution at half the original). The output of the diagonal sampling circuit 409 is coupled to both the positive input terminal of a difference circuit 415 and to the input of another two-dimensional diagonal low-pass spatial pre-filter 412, again with a diamond shaped response pattern. Once again, the two-dimensional diagonal low-pass filter can be of the type previously described, but with the coefficients selected to provide the desired characteristics; namely, a cutoff that is between those of pre-filters 407 and 453. The output of two-dimensional diagonal low-pass spatial pre-filter 412 is coupled to the negative input terminal of difference circuit 415, and also to the diagonal sampling circuit 417. This circuit operates to form a low resolution diagonally sampled image by omitting every other pixel on every other line (it being recalled that the circuit 409 had already left out every other pixel on each line in alternating sense to form a diagonally sampled image), so that the circuit 417 operates to obtain a diagonally sampled image referred to as being at half resolution. The output of circuit 417 is coupled to mid-band processing circuitry, as shown in FIG. 4C.

Figure 4C:
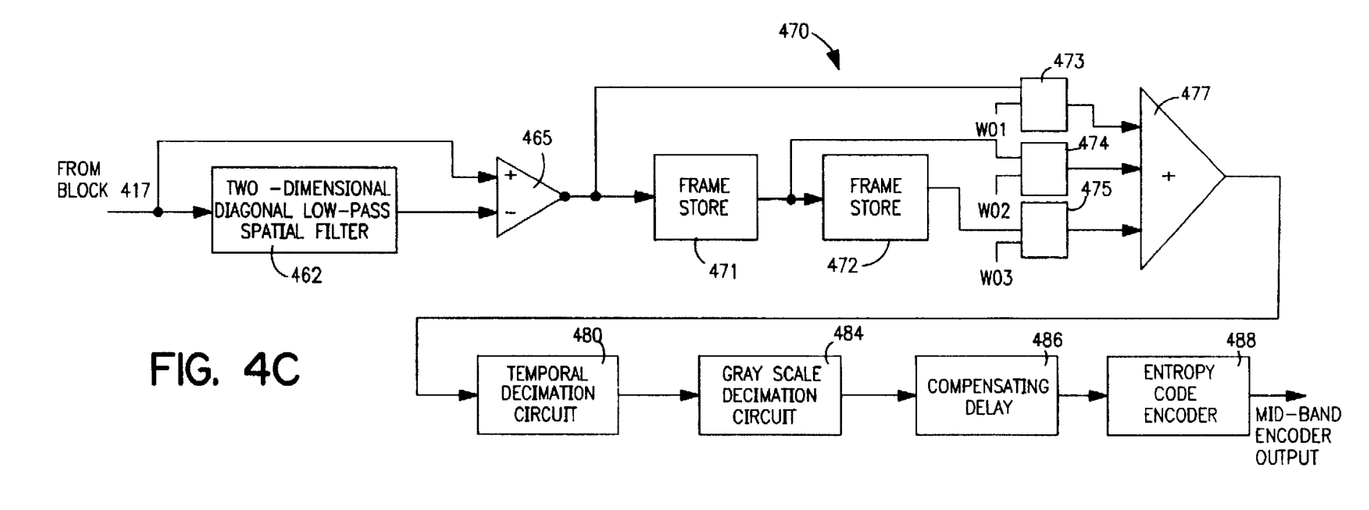

As illustrated in FIG. 4C, the mid-band signal is coupled to a band-pass pre-filter which comprises a two-dimensional diagonal very low pass spatial filter 462, a diagonal sampling circuit 464, and a difference circuit 466. The low-pass spatial filter 462 has a diamond shaped response, and can have the same characteristics and cut-off as the filter 451 in the encoder base band processor. The diagonal sampling circuit 464, which samples to ¼ resolution, can be the same as the diagonal sampling circuit 453 in the encoder base-band processor. The difference circuit 465 receives the input signal to the mid-band processor at its positive terminal and receives the output of the diagonal sampling circuit 464 at its negative input terminal. The result is a band-passed signal containing the mid-band frequencies.

The mid-band signal output from the difference circuit 465 is coupled to a temporal pre-filter circuit 470 that includes, in this embodiment, frame stores 471 and 472 in serial arrangement, so that an undelayed signal (to which a first weighting coefficient $W_{o1}$ is applied), a signal delayed by one frame (to which a second weighting coefficient $W_{o2}$ is applied), and a signal delayed by two frames (to which a third weighting coefficient $W_{o3}$ is applied), are all combined by a summing circuit 477. The first weighting coefficient is applied using multiplier circuit 473, the second weighting coefficient is applied using multiplier circuit 474, and the third weighting coefficient is applied using multiplier circuit 475. The weighting coefficients can have positive or negative values. Reference can be made, for example, to R. A. Roberts, and C. T. Mullis, "Digital Signal Processing", Addison-Wesley Publishing Company, 1987, with regard to how the filter coefficients can be selected to obtain a desired filter characteristic. As discussed above, the preferred cut-off of the low-pass temporal pre-filter is in the range 1.25 to 1.75 times the Nyquist limit. Thus, for example, if the midband frame rate was selected to be 30 frames per second, the preferred cut-off would be in the range 18.75 (=15×1.25) to 26.25 (=15×1.75) cycles per second.

The output of temporal pre-filtering circuit 470 is coupled to the block 480, which represents the temporal decimation of the signal. In the present embodiment, the temporal decimation is implemented by omitting every other frame, and this can be achieved in a manner similar to that of block 453 in the base band processor. It will be understood that the temporal decimation represented by block 480 (which may be, for example, to 15 frames per second in the present embodiment), could decimate using other suitable submultiples of 60, for example 30, 20 or 10 frames per second. The block 484 represents an optional gray scale decimation. For example, in a system where pixels are represented by eight bits, the three least significant bits can be dropped. After the optional gray scale decimation, a compensating delay 486 is provided, for the reason previously discussed, and optional bandwidth compression coding (e.g. entropy coding, as in the other bands) can also be provided, as represented by the block 488.

Referring again to FIG. 4A, the output of difference circuit 415 is the high-band signal; that is, the image detail. This signal is input to a temporal high band pre-filter 430, which includes frame stores 431, 432, and 433 in series, and multipliers 441, 442, 443, and 444, which have respective weighting factors $W_{21}$, $W_{22}$, $W_{23}$, and $W_{24}$, that can be controlled to apply the appropriate weightings to the versions of the signal that are undelayed (weighting factor $W_{21}$), delayed by one frame (weighting factor $W_{22}$), delayed by two frames (weighting factor $W_{23}$), and delayed by three frames (weighting factor $W_{24}$). The multiplier outputs are coupled to summing circuit 445. As above, the weighting factors can have positive and negative values that can be controlled and/or adjusted in known manner to achieve a desired temporal characteristic and cut-off. In this case, in accordance with a feature of the invention, the low-pass temporal pre-filter has a cutoff in the range 1.25 to 1.75 times the Nyquist limit. Thus, for example, if the high band frame rate was selected to be 10 frames per second, the preferred cut-off would be in the range 12.5 to 17.5 cycles per second. The block 447 represents the temporal decimation of the high band signal, the high band signal typically being encoded at the lowest frame rate of the three bands. For example, the frame rate may be 7.5 to 10 frames per second. Gray scale decimation can then be implemented (block 448), for example down to 3 or 4 bits out of an original 8 bit signal. No compensating delay is shown for this processing branch, as it will typically have the longest processing time, it being understood, however, that a compensating delay could be employed, if necessary. An entropy code encoder (block 449) is again shown, and represents the optional further compressional coding.

Figure 7:
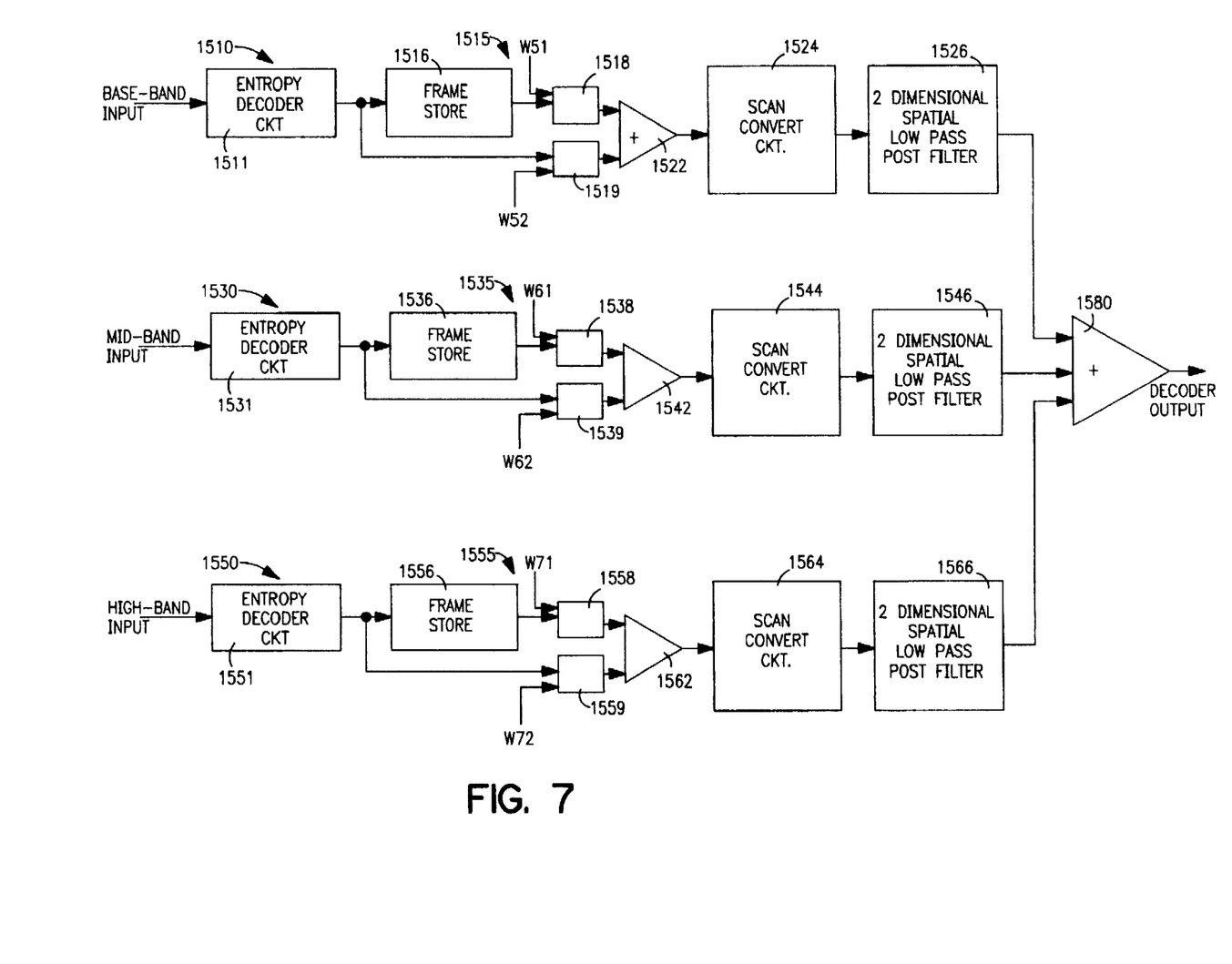
FIG. 7 is a block diagram of an embodiment of a decoder and decoding method which can be utilized to decode signals encoded in accordance with an embodiment of the invention.

Referring to FIG. 7, there is shown a block diagram of a decoder in accordance with an embodiment of the invention. The decoder includes three channels, one for the base-band decoder processing (channel 1510), one for the mid-band decoder processing (channel 1530), and one for the high band decoder processing (channel 1550). The base-band decoder receives the encoded base-band signal which, like the other sub-band coded signals, has been transmitted, stored and fetched, and/or otherwise communicated or coupled to the decoder.

The base-band decoder channel 1510 includes a decoder for the previously implemented entropy encoding, the block 1511 of the present embodiment representing the entropy code decoding circuit. The output of entropy code decoder is coupled to a temporal interpolator 1515 that implements temporal post-filtering and includes, in the present embodiment, a frame store 1516, weighting multipliers 1518 and 1519, and summing circuit 1522. The weighting factors are designated $W_{51}$ and $W_{52}$. The temporal interpolator operates to restore the full temporal resolution for the base band, and the weighting factors $W_{51}$ and $W_{52}$ can be selected and/or adjusted to control the interpolation.

The output of temporal interpolator 1515 is coupled to a scan converter 1524, which scan converts back to the original number of lines; that is a 525 line image in the present embodiment. The output of scan converter 1524 is coupled to a two-dimensional spatial low-pass post-filter 1526. This filter, and the other two-dimensional spatial low-pass post-filters can be of the general type previously described. However, in this case the low-pass cut-off is preferably selected to be near the Nyquist limit.

The decoder mid-band channel 1530 includes circuit blocks similar to those of the decoder base-band channel. Specifically, there is provided an entropy code decoder circuit 1531, a temporal interpolator 1535 that includes frame store 1536, weighting multipliers 1538 and 1539 (with respective weightings $W_{61}$ and $W_{62}$), and a summing circuit 1542, and also includes a scan converter 1544 and a spatial low-pass post filter 1546. In all bands the scan conversion is to the final displayed resolution and the post filter for each band has its cut-off near the Nyquist limit for the decimated pixel pattern of the band. The displayed resolution is generally interlaced scan with cardinal samples.

The decoder high-band channel 1550 includes several circuit blocks that are also similar to the other decoder channels. Specifically, the high band decoder channel 1550 includes an entropy code decoder circuit 1551 and a temporal interpolator 1555 that includes a frame store 1556, multipliers 1558 and 1559 (having respective weighting factors $W_{71}$ and $W_{72}$) and summing circuit 1562. In this channel, however, the scan converter 1564 is provided to restore the decimated pixels, both horizontally and vertically, to the full resolution pattern. The output of scan converter 1564 is coupled to a spatial low-pass post-filter 1566 which preferably operates near the Nyquist limit of the diagonally decimated high band pattern.

The outputs of the spatial low-pass post filters 1526, 1546 and 1566 are coupled to the inputs of a summing circuit 1580, the output of which is the decoded and restored image.

We claim:

1. A method for encoding and decoding an interlaced video signal, comprising the steps of:
    encoding said interlaced video signal, said encoding including: separating said interlaced video signal into frequency bands to obtain a high frequency band and at least one low frequency band; spatially and temporally decimating said at least one low frequency band, said spatial decimation comprising diagonal decimation and said temporal decimation comprising omitting every other field of said at least one low frequency band; scan converting said high frequency band to obtain a progressively scanned signal, and spatially and temporally decimating said high frequency band progressively scanned signal; and
    decoding the encoded signals, said decoding including: temporally interpolating said at least one low frequency band; spatially post-filtering said high frequency band; and combining said bands.

2. The method as defined by claim 1, wherein said encoder includes low pass diagonal spatial pre-filtering and diagonal sampling of said at least one low frequency band, and low pass diagonal spatial pre-filtering and diagonal sampling of said high frequency band; and wherein said decoding includes low pass spatial post-filtering of said at least one low frequency band and low pass spatial post-filtering of said high frequency band.

3. The method as defined by claim 1, wherein said encoder includes low-pass temporal pre-filtering of said at least one low frequency band, and low pass temporal pre-filtering of said high frequency band; and wherein said decoder further includes low-pass temporal post-filtering of said at least one low frequency band, and low pass temporal post-filtering of said high frequency band.

4. The method as defined by claim 3, wherein the low-pass temporal pre-filtering of said at least one low frequency band and said high band frequency band each have a filter cut-off in the range 1.25 to 1.75 times the Nyquist limit for the frame rate of the respective band.

5. The method as defined by claim 2, wherein the low-pass temporal pre-filtering of said at least one low frequency band and said high band frequency band each have a filter cut-off in the range 1.25 to 1.75 times the Nyquist limit for the frame rate of the respective band.

6. The method as defined by claim 1, wherein said at least one low frequency band includes two bands, respectively designated a low frequency band and a mid frequency band.

7. The method as defined by claim 6, wherein said low frequency band and said mid frequency band are temporally decimated to different rates.

8. Apparatus for encoding and decoding an interlaced video signal, comprising:

an encoder for encoding said interlaced video signal, said encoder including: means for separating said interlaced video signal into frequency bands to obtain a high frequency band and at least one low frequency band; means for spatially and temporally decimating said at least one low frequency band, said spatial decimation comprising diagonal decimation and said temporal decimation comprising omitting every other field of said at least one low frequency band; means for scan converting said high frequency band to obtain a progressively scanned signal, and means for spatially and temporally decimating said high frequency band progressively scanned signal; and a decoder for decoding the encoded signals, said decoder including: means for temporally interpolating said at least one low frequency band; means for spatially post-filtering said high frequency band; and means for combining said bands.

9. Apparatus as defined by claim 8, wherein said encoder includes means for low-pass temporal pre-filtering of said at least one low frequency band and means for low pass temporal pre-filtering of said high frequency band; and wherein said decoder further includes means for low-pass temporal post-filtering of said at least one low frequency band, and means for low pass temporal post-filtering of said high frequency band.

10. Apparatus as defined by claim 9, wherein said means for low-pass temporal pre-filtering of said at least one low frequency band and said low-pass temporal pre-filtering of said high frequency band are each operative to have a filter cut-off in the range 1.25 to 1.75 times the Nyquist limit for the frame rate of the respective band.

* * * * *